US012770316B2

(12) United States Patent
Lee et al.

(10) Patent No.: US 12,770,316 B2
(45) Date of Patent: Oct. 20, 2026

(54) METHOD AND APPARATUS FOR DECOMPOSING LOW- DENSITY MATERIAL AND METHOD AND APPARATUS FOR OBTAINING ATTENUATION CORRECTION IMAGE BASED ON DUAL-ENERGY TECHNIQUE

(71) Applicant: UIF (UNIVERSITY INDUSTRY FOUNDATION), YONSEI UNIVERSITY, Seoul (KR)

(72) Inventors: Su Hwan Lee, Seoul (KR); Kyu Bom Kim, Seoul (KR); Kyuseok Kim, Seoul (KR); Hyun Joon Choi, Wonju-si (KR); Yeonkyeong Kim, Seoul (KR)

(73) Assignee: UIF (UNIVERSITY INDUSTRY FOUNDATION), YONSEI UNIVERSITY, Seoul (KR)

( * ) Notice: Subject to any disclaimer, the term of this patent is extended or adjusted under 35 U.S.C. 154(b) by 217 days.

(21) Appl. No.: 18/817,911

(22) Filed: Aug. 28, 2024

(65) Prior Publication Data

US 2025/0086875 A1 Mar. 13, 2025

(30) Foreign Application Priority Data

Aug. 30, 2023 (KR) ........................ 10-2023-0114815

(51) Int. Cl.
*G06T 15/00* (2011.01)

(52) U.S. Cl.
CPC ........ *G06T 15/00* (2013.01); *G06T 2211/408* (2013.01)

(58) Field of Classification Search
CPC ... G06T 15/00; G06T 2211/408; G06T 12/10; A61B 6/032; A61B 6/4241; A61B 6/482;
(Continued)

(56) References Cited

U.S. PATENT DOCUMENTS 10,231,689 B2 3/2019 Han et al.
11,172,907 B2 11/2021 Milioni De Carvalho et al.

FOREIGN PATENT DOCUMENTS

JP 2010-075555 A 4/2010
KR 10-1425530 B1 8/2014
(Continued)

OTHER PUBLICATIONS

Sellerer et al., "Dual-Energy X-Ray Dark-Field Material Decomposition", IEEE Transactionson Medical Imaging, vol. 40, No. 3, pp. 974-985. (Year: 2021).*
(Continued)

*Primary Examiner* — Kiho Kim
(74) *Attorney, Agent, or Firm* — Maschoff Brennan

(57) ABSTRACT

A dual energy technique based material decomposing method according to the present disclosure includes obtaining intensity change information between a radiographic image of a decomposition material phantom formed of a first material and a second material to be decomposed and a radiographic image of an equivalent material phantom formed of a first equivalent material and a second equivalent material corresponding to the first material and the second material, respectively, using a simulated radiographic imaging system, converting an image intensity of the equivalent material phantom using the intensity change information from a dual energy image, obtaining a material decomposition constant based on the dual energy image with a converted image intensity, and decomposing the first material and the second material from a dual energy image of an object including the first material and the second material using the material decomposition constant.

11 Claims, 9 Drawing Sheets

(58) Field of Classification Search
CPC ..... A61B 6/5205; A61B 6/5217; A61B 6/583; G16H 30/20
See application file for complete search history.

(56) References Cited

FOREIGN PATENT DOCUMENTS

| | | | |
|---|---|---|---|
| KR | 10-2015-0018665 | A | 2/2015 |
| KR | 10-2022-0146046 | A | 11/2022 |
| KR | 10-2022-0165117 | A | 12/2022 |

OTHER PUBLICATIONS

KR Office Action dated May 29, 2025 as received in Application No. 10-2023-0114815.

* cited by examiner

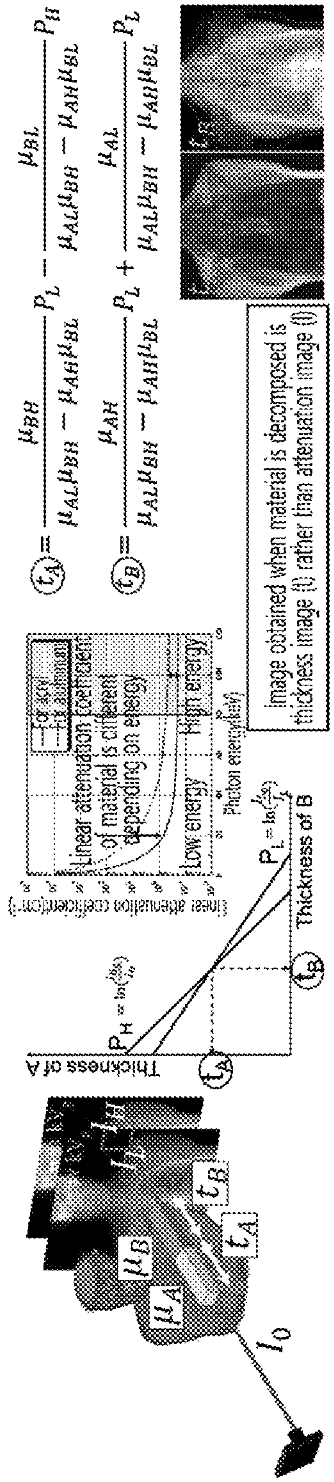
[FIG. 1]

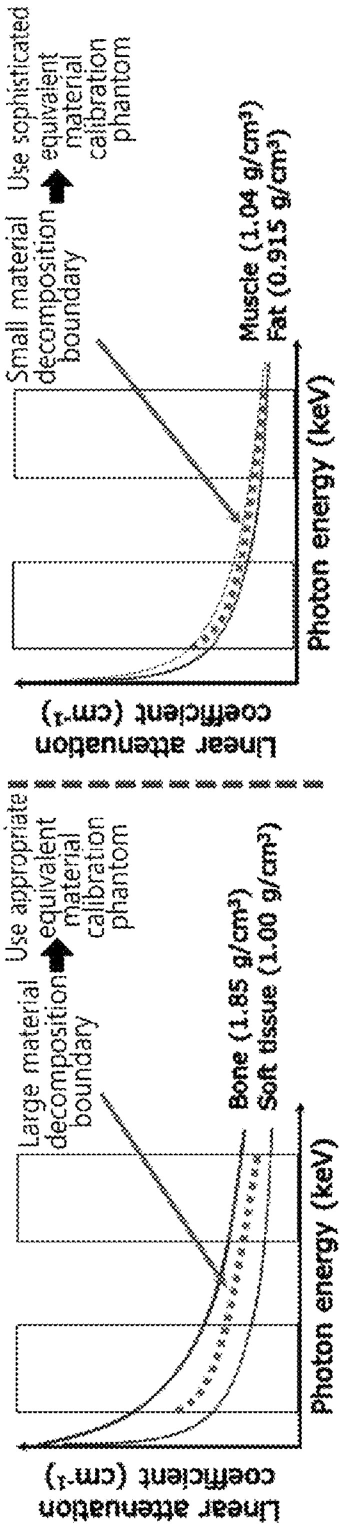
[FIG. 2]

[FIG. 3]
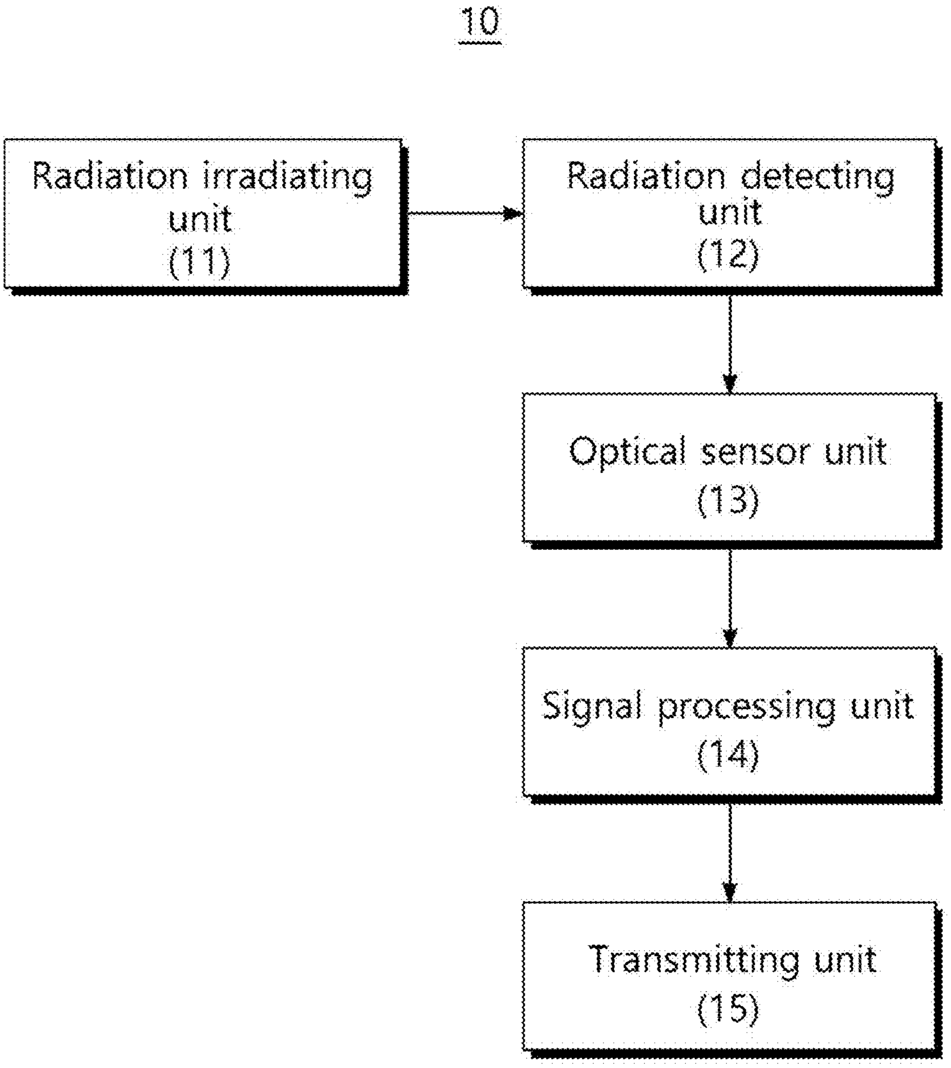

[FIG. 4]
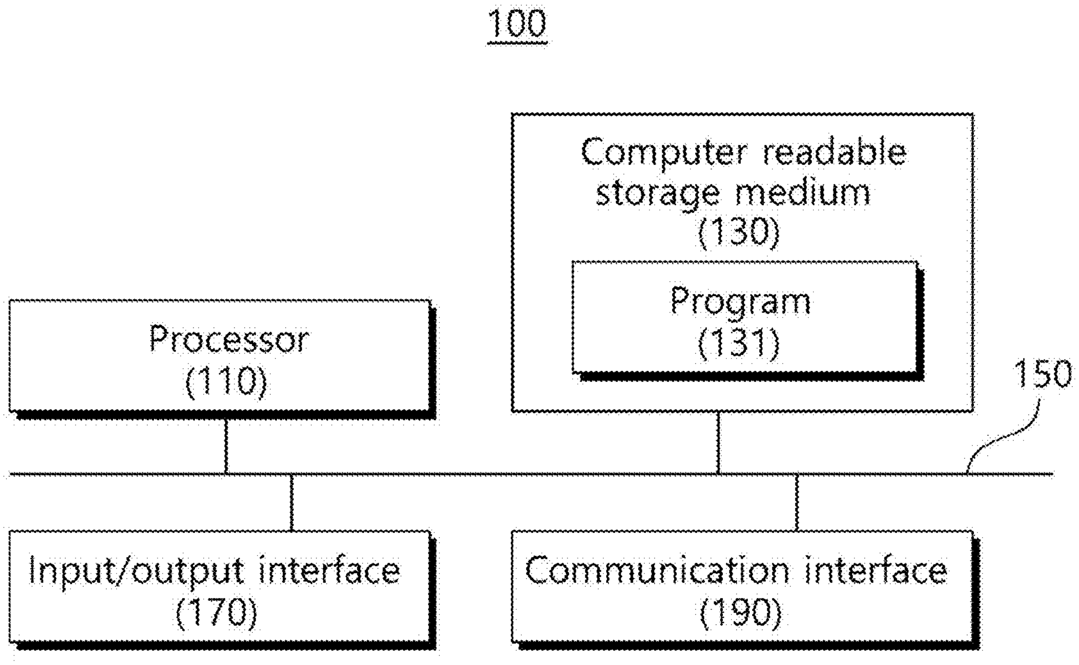

[FIG. 5]
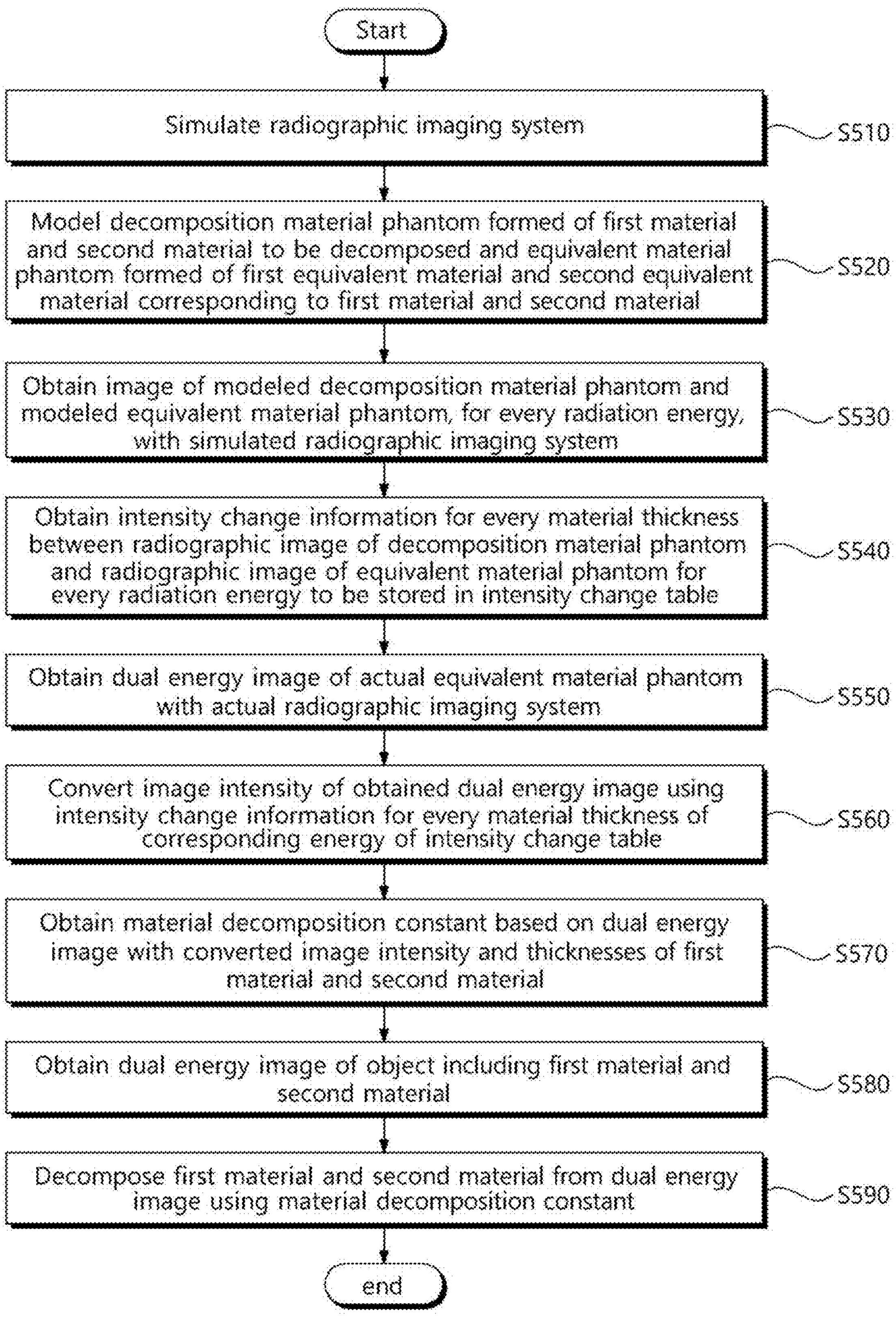

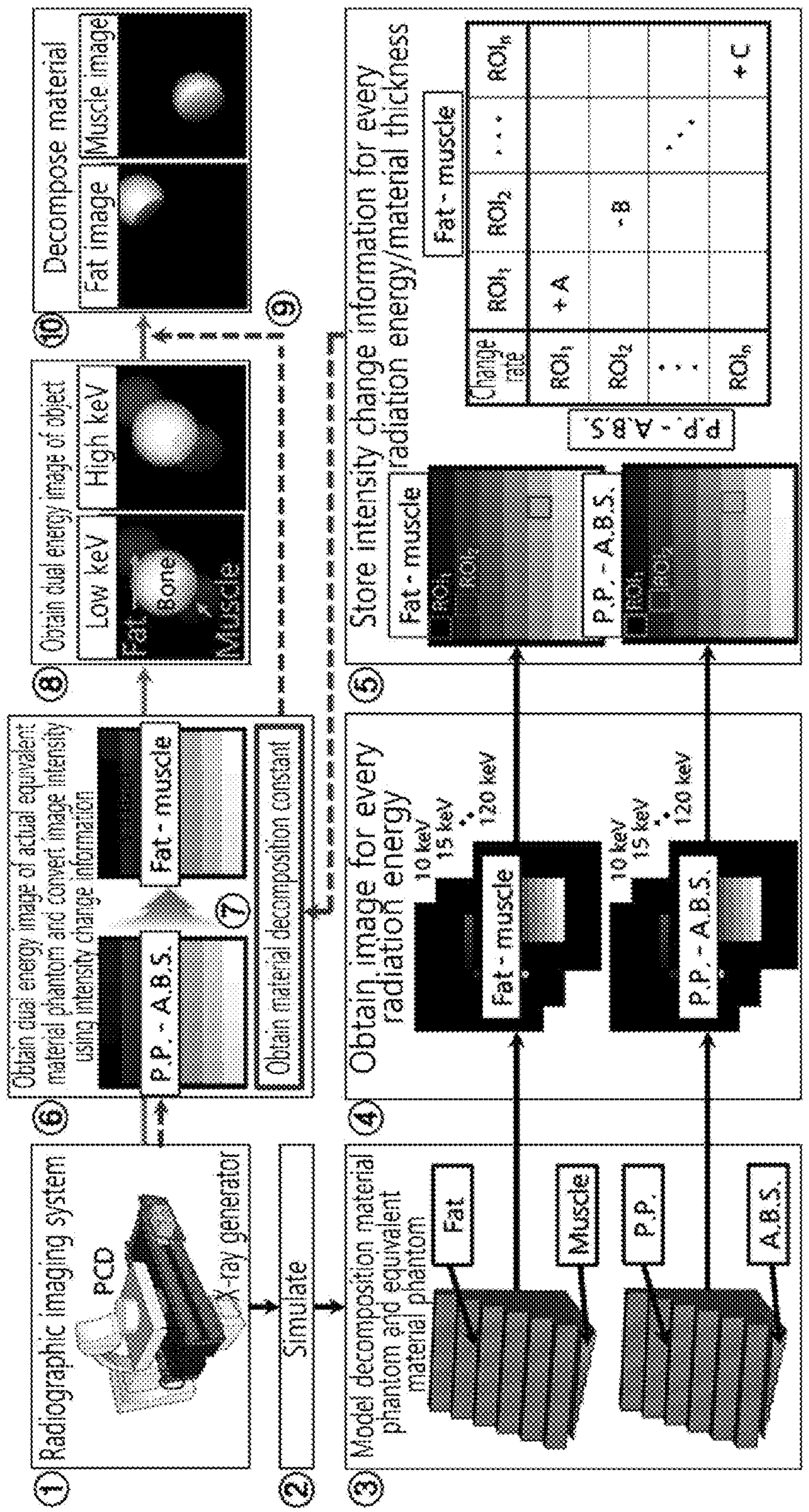
[FIG. 6]

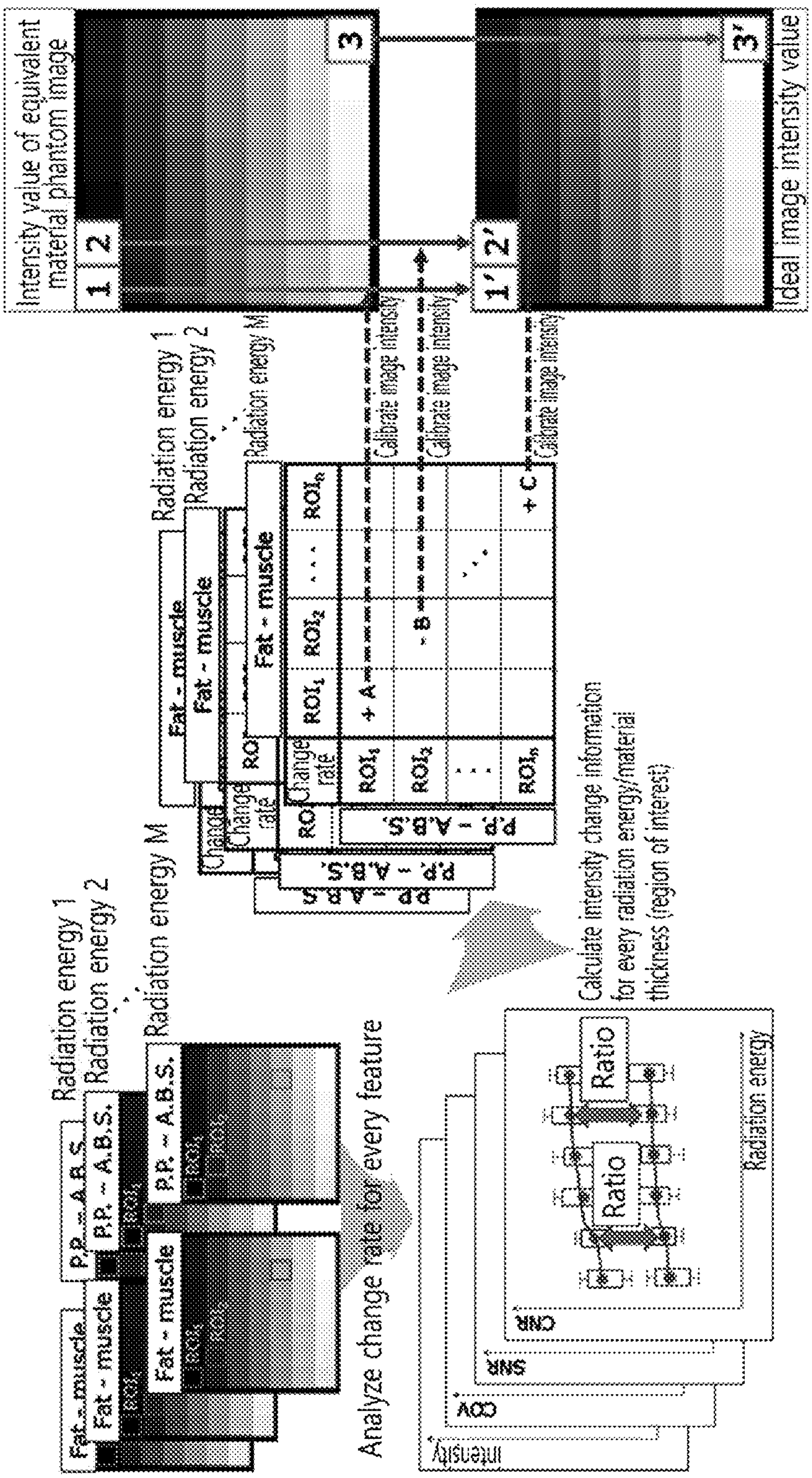
[FIG. 7]

[FIG. 8]
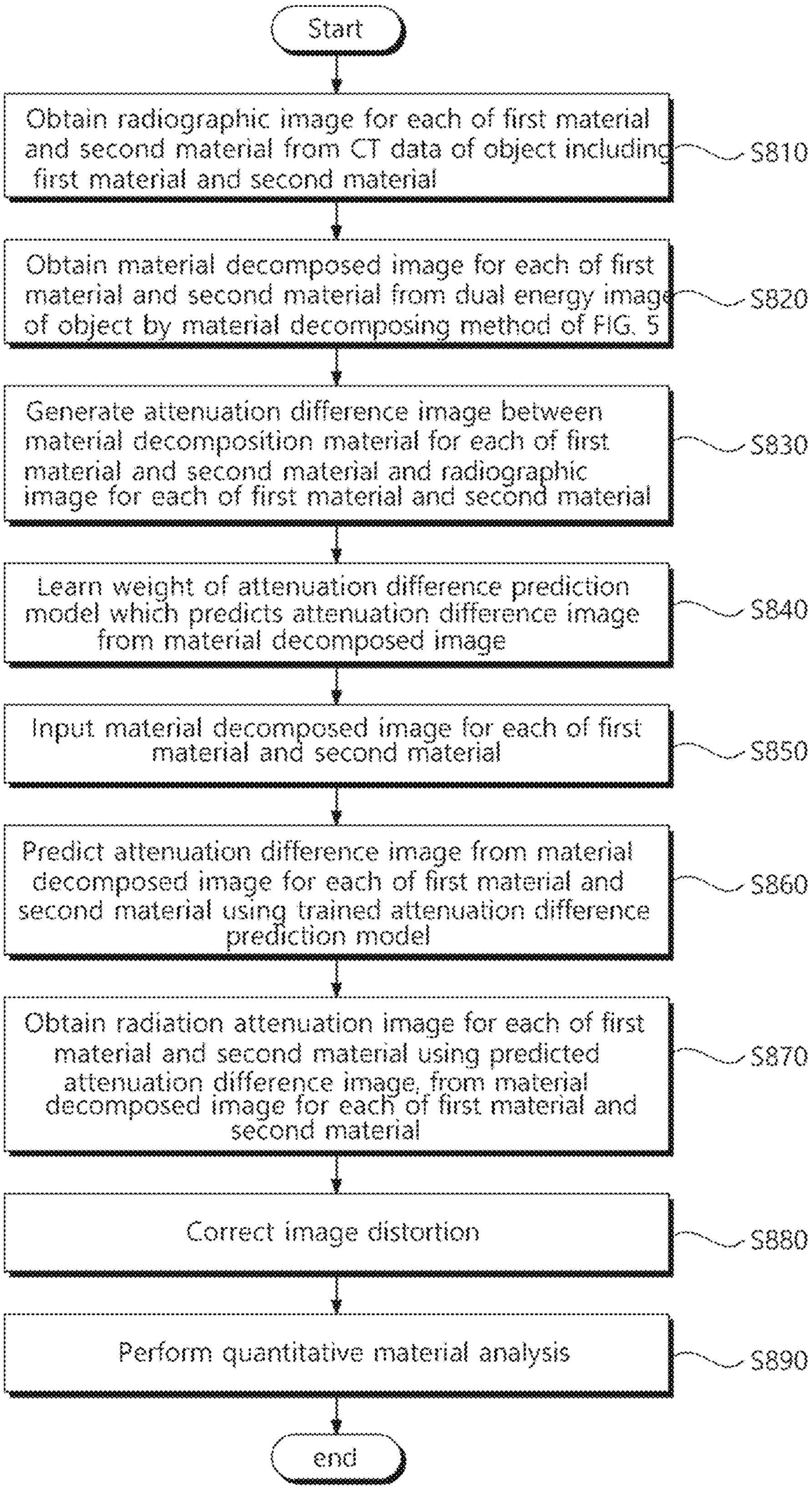

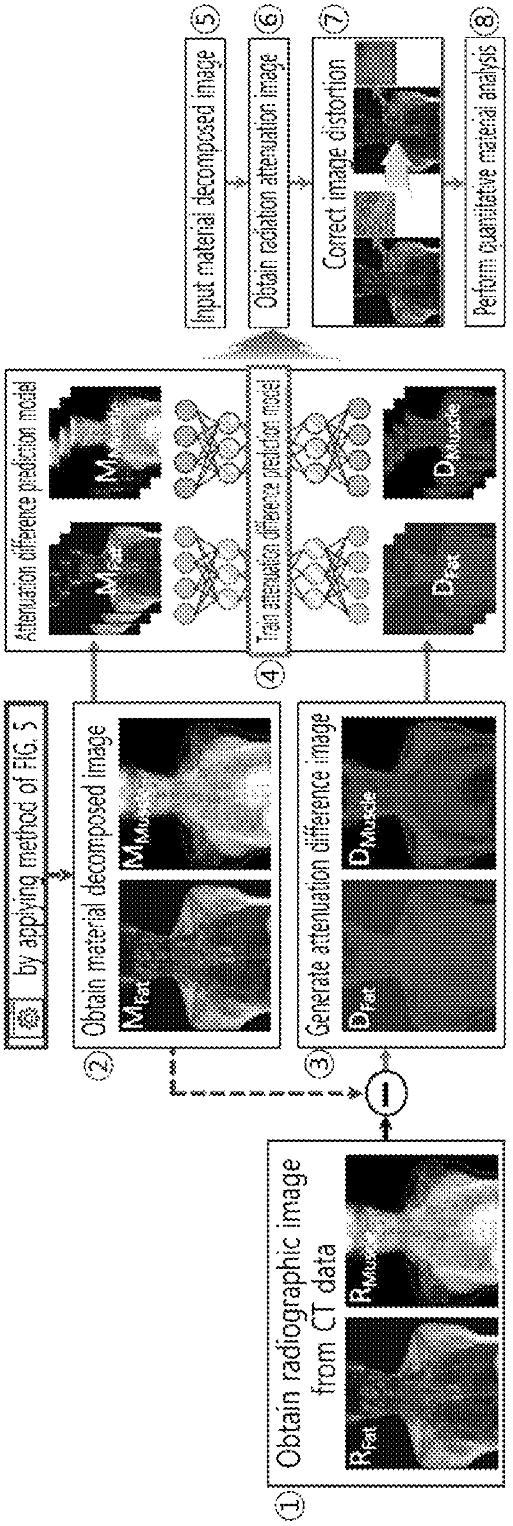
[FIG. 9]

METHOD AND APPARATUS FOR DECOMPOSING LOW- DENSITY MATERIAL AND METHOD AND APPARATUS FOR OBTAINING ATTENUATION CORRECTION IMAGE BASED ON DUAL-ENERGY TECHNIQUE

CROSS-REFERENCE TO RELATED APPLICATIONS

This application claims priority to and the benefit of Korean Patent Application No. 10-2023-0114815 filed in the Korean Intellectual Property Office on Aug. 30, 2023, the entire contents of which are incorporated herein by reference.

BACKGROUND

Technical Field

The present disclosure relates to a method and an apparatus for decomposing a low-density material based on a dual-energy technique and a method and an apparatus for obtaining an attenuation correction image based on a dual-energy technique.

Description of the Related Art

In the case of a general radiographic image, an image in which internal organs and materials of the object are distinguished is obtained by a task of detecting radiographic information which is attenuated according to a linear attenuation coefficient corresponding to an energy of the material and a movement length while passing inside of a three-dimensional material with a two-dimensional detector to be imaged. The dual-energy imaging technique decomposes a material by attenuating or amplifying signals of a material with a high density and a material with a low density using an attenuation difference according to materials of radiation having two different energies to decompose the material. FIG. 1 is a view explaining a concept of a dual energy imaging technique. An image obtained when the material is decomposed by the dual energy imaging technique is a thickness image (t) rather than an attenuation image (I).

According to the most common method to decompose a material by the dual energy technique, an equivalent material phantom having linear attenuation coefficient which is equal to or similar to that of a material to be decomposed is used to calculate a material decomposition constant with respect to each material thickness and the material is decomposed using the same.

FIG. 2 illustrates an example of a difference in linear attenuation coefficients of a high density material and a low density material. When the material is decomposed with the dual energy technique, the high density material and the low density material may be decomposed with a high accuracy using the equivalent material phantom (see the left side of FIG. 2). However, as illustrated in the right side of FIG. 2, in the case of the low density material having a small difference in linear attenuation coefficients for every radiation energy, a decomposition boundary is narrow so that there is a limitation in decomposition of the material. In order to overcome this problem, there is a method for decomposing the material by utilizing a calibration phantom using a sophisticated equivalent material, but it has the disadvantage of not guaranteeing reproducibility because it is difficult to show a linear attenuation coefficient equivalent to that of the material to be decomposed. When a low-density material is decomposed using tomographic imaging equipment (for example, CT, tomosynthesis, etc.), the decomposition accuracy is improved, but there are problems of increased overexposure and mechanical complexity. In recent years, decomposition of low-density materials using dark-field type radiographic imaging techniques rather than attenuated radiographic imaging is being studied, but there are limitations to the imaging conditions and it is difficult to perform quantitative analysis of the decomposed materials.

The image results (thickness information) obtained by performing material decomposition using the dual energy technique do not have the same image information values as the radiographic image results (attenuation information) obtained from the actually same object, so there is a limitation in performing quantitative material analysis.

RELATED ART DOCUMENT

Patent Document

Korean Unexamined Patent Application Publication No. 10-2022-0146046 (published on Nov. 1, 2022)
Korean Unexamined Patent Application Publication No. 10-2022-0165117 (published on Dec. 14, 2022)

SUMMARY

An object to be achieved by the present disclosure is to provide a low-density material decomposing method and apparatus based on a dual energy technique which effectively decompose a low density material based on a dual energy technique.

Further, another object to be achieved by the present disclosure is to provide an attenuation correction image obtaining method and apparatus based on a dual energy technique which convert information of an image obtained by the dual energy technique into attenuation information of the corresponding material to perform quantitative material analysis.

The technical object to be achieved by the present disclosure is not limited to the above-mentioned technical objects, and other technical objects, which are not mentioned above, can be clearly understood by those skilled in the art from the following descriptions.

In order to achieve the above-described technical objects, a dual energy technique based material decomposing method according to the present disclosure includes a step of obtaining intensity change information between a radiographic image of a decomposition material phantom formed of a first material and a second material to be decomposed and a radiographic image of an equivalent material phantom formed of a first equivalent material and a second equivalent material corresponding to the first material and the second material, respectively, using a simulated radiographic imaging system; a step of converting an image intensity of the equivalent material phantom using the intensity change information from a dual energy image; a step of obtaining a material decomposition constant based on the dual energy image with a converted image intensity; and a step of decomposing the first material and the second material from a dual energy image of an object including the first material and the second material using the material decomposition constant.

The step of obtaining intensity change information includes: a step of modeling the decomposition material phantom and the equivalent material phantom; a step of obtaining a radiographic image for the modeled decomposition material phantom and equivalent material phantom, with the simulated radiographic imaging system; and a step of obtaining intensity change information between the radiographic image of the modeled decomposition material phantom and the radiographic image of the modeled equivalent material phantom.

In the step of obtaining a radiographic image, an image for every radiation energy for each of the modeled decomposition material phantom and equivalent material phantom and in the step of obtaining intensity change information, the intensity change information for every radiation energy is obtained.

In the step of obtaining intensity change information, for every radiation energy, an image intensity mean value or change information of a representative value between a region of interest corresponding to a thickness of a material to be decomposed in a radiographic image of the decomposition material phantom and an area matching the region of interest of the radiographic image of the decomposition material phantom in the radiographic image of the equivalent material phantom is obtained to be stored in an intensity change table.

The step of converting an image intensity includes: a step of obtaining a dual energy image for the actual equivalent material phantom with the actual radiographic imaging system; and a step of converting the image intensity of the obtained dual energy image using intensity change information for every material thickness of the energy of the intensity change table.

In order to achieve the above-described technical object, according to another aspect of the present disclosure, a computer program is stored in a computer readable storage medium to allow a computer to execute the dual energy technique based material decomposing method.

In order to achieve the above-described technical object, a dual energy technique based material decomposing apparatus according to the present disclosure includes a memory which stores one or more programs to decompose a material based on a dual energy technique; and one or more processors which perform an operation of decomposing a material based on a dual energy technique by one or more programs stored in the memory, and the processor is configured to obtain intensity change information between a radiographic image of a decomposition material phantom formed of a first material and a second material to be decomposed and a radiographic image of an equivalent material phantom formed of a first equivalent material and a second equivalent material corresponding to the first material and the second material, respectively, using a simulated radiographic imaging system, convert an image intensity of the equivalent material phantom using the intensity change information from a dual energy image, obtain a material decomposition constant based on the dual energy image with a converted image intensity, and decompose the first material and the second material from a dual energy image of an object including the first material and the second material using the material decomposition constant.

When the intensity change information is obtained, the processor is configured to model the decomposition material phantom and the equivalent material phantom, obtain a radiographic image for the modeled decomposition material phantom and equivalent material phantom, with the simulated radiographic imaging system, and obtain intensity change information between the radiographic image of the modeled decomposition material phantom and the radiographic image of the modeled equivalent material phantom.

The processor is configured to obtain an image for every radiation energy for each of the modeled decomposition material phantom and equivalent material phantom when a radiographic image is obtained and obtain the intensity change information for every radiation energy when the intensity change information is obtained.

The processor is configured to obtain, for every radiation energy, an image intensity mean value or change information of a representative value between a region of interest corresponding to a thickness of a material to be decomposed in a radiographic image of the decomposition material phantom and an area matching the region of interest of the radiographic image of the decomposition material phantom in the radiographic image of the equivalent material phantom to be stored in an intensity change table when intensity change information is obtained.

When the image intensity is converted, the processor receives a dual energy image obtained for an actual equivalent material phantom with an actual radiographic imaging system and converts the image intensity of the obtained dual energy image using intensity change information for every material thickness of the energy of the intensity change table.

In order to achieve the above-described technical object, a dual energy technique based attenuation correction image obtaining method according to the present disclosure includes a step of training an attenuation difference prediction model to predict an attenuation difference image between a material decomposed image and a radiographic image from the material decomposed image; a step of predicting the attenuation difference image using the learned attenuation difference prediction model from the material decomposed image for each of the first material and the second material; and a step of obtaining a radiation attenuation image for each of the first material and the second material using the predicted attenuation difference image, from the material decomposed image.

The step of training an attenuation difference prediction model includes: a step of obtaining a radiographic image for each of the first material and the second material from three-dimensional data of an object including the first material and the second material; a step of obtaining a material decomposed image for each of the first material and the second material from a dual energy image of the object; a step of generating an attenuation difference image between the material decomposed image and the radiographic image; and a step of learning a weight of the attenuation difference prediction model with the material decomposed image and the attenuation difference image as learning data.

In the step of obtaining a material decomposed image, the material decomposed image is obtained using the dual energy technique based material decomposing method.

In the step of obtaining a radiographic image for each of the first material and the second material, three-dimensional data in which the first material and the second material are decomposed is generated from the three-dimensional data and the radiographic image is obtained using digitally reconstructed radiograph (DRR) therefrom. In order to achieve the above-described technical object, according to another aspect of the present disclosure, a computer program is stored in a computer readable storage medium to allow a computer to execute the dual energy technique based attenuation correction image obtaining method.

In order to achieve the above-described technical object, a dual energy technique based attenuation correction image obtaining apparatus according to the present disclosure includes a memory which stores one or more programs to obtain an attenuation correction image based on a dual energy technique; and one or more processors which perform an operation of obtaining an attenuation correction image based on a dual energy technique by one or more programs stored in the memory, and the processor is configured to train an attenuation difference prediction model to predict an attenuation difference image between a material decomposed image and a radiographic image from the material decomposed image, predict the attenuation difference image from the material decomposed image for the first material and the second material using the learned attenuation difference prediction model, and obtain a radiation attenuation image for each of the first material and the second material from the material decomposed image using the predicted attenuation difference image.

When the attenuation difference prediction model is trained, the processor is configured to obtain a radiographic image for each of the first material and the second material from three-dimensional data of an object including the first material and the second material; obtain a material decomposed image for each of the first material and the second material from a dual energy image of the object, generate an attenuation difference image between the material decomposed image and the radiographic image, and learn a weight of the attenuation difference prediction model with the material decomposed image and the attenuation difference image as learning data.

When the material decomposed image is obtained, the processor is configured to obtain the material decomposed image using the dual energy technique based material decomposing method.

According to the present disclosure, the low density material may be accurately and effectively decomposed based on the dual energy technique.

Further, according to the present disclosure, a material decomposed image obtained by the dual energy technique is converted into a radiographic attenuation image of the corresponding material to enable the quantitative material analysis of the corresponding material.

Effects of the present disclosure are not limited to the above-mentioned effects, and other effects, which are not mentioned above, can be clearly understood by those skilled in the art from the following descriptions.

BRIEF DESCRIPTION OF THE DRAWINGS

FIG. 1 is a view explaining a concept of a dual energy imaging technique;

FIG. 2 illustrates an example of a difference in linear attenuation coefficients of a high density material and a low density material;

FIG. 3 illustrates one example of a block diagram of a radiographic imaging system;

FIG. 4 illustrates a block diagram of a dual-energy technique based material decomposing apparatus and/or a dual-energy technique based attenuation correction image obtaining apparatus according to an exemplary embodiment of the present disclosure;

FIG. 5 illustrates a flowchart of a dual-energy technique based material decomposing method according to an exemplary embodiment of the present disclosure;

FIG. 6 illustrates an example of an operation of a dual-energy technique based material decomposing method according to an exemplary embodiment of the present disclosure;

FIG. 7 illustrates an example of converting an image intensity for a dual energy image of an equivalent material phantom using intensity change information;

FIG. 8 illustrates a flowchart of a dual-energy technique based attenuation correction image obtaining method according to an exemplary embodiment of the present disclosure; and FIG. 9 illustrates an example of an operation of a dual-energy technique based attenuation correction image obtaining method according to an exemplary embodiment of the present disclosure.

DETAILED DESCRIPTION OF THE EMBODIMENT

Hereinafter, exemplary embodiments of the present disclosure will be described in detail with reference to the drawings. Substantially same components in the following description and the accompanying drawings may be denoted by the same reference numerals so that a redundant description will be omitted. Further, in the description of the exemplary embodiment, if it is considered that specific description of related known configuration or function may cloud the gist of the present disclosure, the detailed description thereof will be omitted.

FIG. 3 illustrates one example of a block diagram of a radiographic imaging system. Referring to FIG. 3, a radiographic imaging system 10 includes a radiation irradiating unit 11, a radiation detecting unit 12, an optical sensor unit 13, a signal processing unit 14, and a transmitting unit 15. According to an exemplary embodiment, some blocks of the radiographic imaging system 10 may be added, modified, or deleted.

The radiation irradiating unit 11 generates and irradiates radiation (for example, X-ray) to an object. The radiation irradiating unit 11 may be implemented to attach or detach a collimator to control a radiation field.

The radiation detecting unit 12 detects radiation that has passed through an object and converts it into a flash signal. The radiation detecting unit 12 may be implemented by one (a single type) or a plurality (array type) of bismuth germanate (BGO), lutetium oxyorthosilicate (LSO), lutetium yttrium oxyorthosilicate (LYSO), lutetium aluminum perovskite (LuAP), lutetium yttrium aluminum perovskite (LuYAP), lanthanum bromide (LaBr3), lutetium iodide (LuI3), gadolinium oxyorthosilicate (GSO), lutetium gadolinium oxyorthosilicate (LGSO), lutetium aluminum garnet (LuAG), and lutetium fine silicate (LFS).

The optical sensor unit 13 converts the flash signal output from the radiation detecting unit 12 into an electrical signal. The optical sensor unit 13 may use vacuum tubes or semiconductor-type optical sensors, such as photomultiplier tubes (PMT), avalanche photodiodes (APD), silicon photomultiplier tubes (SiPM), digital silicon photomultiplier tubes (D-SiPM), CZT, CdTe, or PIN.

The signal processing unit 14 performs signal processing on an electrical signal output from the optical sensor unit 13. The signal processing unit 14 is configured by an analog signal processor and a digital signal processor. The analog signal processor amplifies an output signal of the optical sensor unit 13 to be easily processed and adjusts a signal rising time, a falling time, a signal width, and an offset voltage and includes a comparator which digitizes an analog signal and a circuit which reduces a number of channels or determines a light distribution degree. The digital signal processor obtains a detection time of the output signal of the analog signal processor, a magnitude of detected signal, and a location where the signal is detected by means of an ADC, TDC, or FPGA (Xilinx family or Altera family) and compares data obtained within a specific time to obtain a real-time digital signal.

The transmitting unit 15 transmits signal information obtained by the signal processing unit 14 to a PC or a server through a buffer by a wired communication method (for example, serial or Ethernet) or a wireless communication method (for example, Bluetooth, Wi-Fi, optical wireless communication (OWC).

FIG. 4 illustrates a block diagram of a dual-energy technique based material decomposing apparatus and/or a dual-energy technique based attenuation correction image obtaining apparatus according to an exemplary embodiment of the present disclosure.

When the apparatus of FIG. 4 operates as a dual energy technique based material decomposing apparatus (hereinafter, referred to as a "material decomposing apparatus"), the material decomposing apparatus 100 obtains a material decomposition constant for decomposing a first material and a second material and decomposes the first material and the second material from a dual energy image of an object including the first material and the second material using the material decomposition constant to obtain a material decomposed image.

Here, the dual energy image is configured by a low energy image obtained by irradiating a low energy (for example, 30 to 60 Kev) radiation to the object and a high energy image obtained by irradiating a high energy (for example, 80 to 144 Kev) radiation to the object.

When the apparatus of FIG. 4 operates as a dual energy technique based attenuation correction image obtaining apparatus (hereinafter, referred to as an "attenuation correction image obtaining apparatus"), the attenuation correction image obtaining apparatus 100 obtains a radiation attenuation image from a material decomposed image of the first material and the second material.

To this end, the material decomposing apparatus or the attenuation correction image obtaining apparatus 100 may include one or more processors 110, a computer readable storage medium 130, and a communication bus 150.

The processor 110 controls the material decomposing apparatus or the attenuation correction image obtaining apparatus 100 to operate. For example, the processor 110 may execute one or more programs 131 stored in the computer readable storage medium 130. One or more programs 131 include one or more computer executable instructions and when the computer executable instruction is executed by the processor 110, the computer executable instruction may be configured to allow the material decomposing apparatus or the attenuation correction image obtaining apparatus 100 to perform an operation for decomposing materials or obtaining the attenuation correction image based on a dual energy technique.

The computer readable storage medium 130 is configured to store a computer executable instruction or a program code, program data and/or other appropriate format of information to decompose materials or obtain the attenuation correction image based on a dual energy technique. The program 131 stored in the computer readable storage medium 130 includes a set of instructions executable by the processor 110. In one exemplary embodiment, the computer readable storage medium 130 may be a memory (a volatile memory such as a random access memory, a non-volatile memory, or an appropriate combination thereof), one or more magnetic disk storage devices, optical disk storage devices, flash memory devices, and another format of storage media which are accessed by the multiple material decomposing apparatus 100 and store desired information, or an appropriate combination thereof.

The communication bus 150 interconnects various other components of the material decomposing apparatus or the attenuation correction image obtaining apparatus 100 including the processor 110 and the computer readable storage medium 130 to each other.

The material decomposing apparatus or the attenuation correction image obtaining apparatus 100 may include one or more input/output interfaces 170 and one or more communication interfaces 190 which provide an interface for one or more input/output devices. The input/output interface 170 and the communication interface 190 are connected to the communication bus 150. An input/output device (not illustrated) may be connected to the other components of the material decomposing apparatus or the attenuation correction image obtaining apparatus 100 by means of the input/output interface 170.

FIG. 5 illustrates a flowchart of a dual-energy technique based material decomposing method according to an exemplary embodiment of the present disclosure and FIG. 6 illustrates an example of an operation of a dual-energy technique based material decomposing method according to an exemplary embodiment of the present disclosure.

Referring to FIG. 5, the processor 110 of the material decomposing apparatus 100 simulates a radiographic imaging system (S510). For example, the processor 110 virtually implements the same environment and conditions (for example, a radiation irradiating unit, a radiation detecting unit, irradiation conditions, etc.) as the actual radiographic imaging system 10 through simulation.

Next, the processor 110 models a decomposition material phantom formed of a first material and a second material to be decomposed and an equivalent material phantom formed of a first equivalent material and a second equivalent material corresponding to the first material and the second material, respectively.

Here, the first material and the second material to be decomposed are low density materials, and for example, the first material is fat and the second material is muscle. The first equivalent material and the second equivalent material are materials having the equal/similar linear attenuation coefficient to the first material and the second material, respectively, and for example, the first equivalent material is polypropylene (P.P.) and the second equivalent material may be acrylonitrile butadiene styrene (A.B.S.) copolymer.

The decomposition material phantom and the equivalent material phantom have the same shape and are formed in a step-shape to be formed with a combination of areas having different thicknesses. For example, the decomposition material phantom includes a step-shaped first sub phantom which is formed of the first material and a step-shaped second sub phantom which is located on one surface of the first sub phantom and is formed of the second material. The first sub phantom and the second sub phantom are disposed such that a step direction of the first sub phantom (that is, a direction that a thickness of the first material is changed) and a step direction of the second sub phantom (that is, a direction that a thickness of the second material is changed) are perpendicular to each other.

Next, the processor 110 obtains an image for every radiation energy for the modeled decomposition material phantom and the modeled equivalent material phantom, with the simulated radiographic imaging system. Here, the obtained radiographic image has an image intensity value for every region of interest (ROI) corresponding to a combination of thicknesses of two materials belonging to the corresponding phantom. That is, the radiographic image for the decomposition material phantom has an image intensity value for every region of interest corresponding to the combination of the thicknesses of the first material and the second material and the radiographic image for the equivalent material phantom has an image intensity value for every region of interest corresponding to the combination of the thicknesses of the first equivalent material and the second equivalent material. In the meantime, even though in FIG. 6, it is illustrated that images for a plurality of radiation energies (for example, 10 keV, 15 keV, . . . 120 keV) are obtained, according to the exemplary embodiment, only two images for two radiation energies to be used to obtain a dual energy image to be described below may be obtained.

Next, the processor 110 obtains intensity change information for every material thickness between a radiographic image of the decomposition material phantom and a radiographic image of the equivalent material phantom for every radiation energy and stores the intensity change information in an intensity change table (S540). That is, for every radiation energy, an image intensity mean value or change information (difference or a ratio) of a representative value between a region of interest corresponding to a thickness of a material to be decomposed in a radiographic image of the decomposition material phantom and an area matching the region of interest of the radiographic image of the decomposition material phantom in the radiographic image of the equivalent material phantom is calculated for every combination (region of interest) of thicknesses of two materials and is stored in the table.

When the image intensity change information is obtained, not only the image intensity mean value, but also change information, such as a coefficient of variation (COV), a signal to noise ratio (SNR), and a contrast to noise ratio (CNR), is obtained and the image intensity change information is calculated using them. For example, the change information of the image intensity mean value is corrected or recalculated in accordance with the change in the COV, SNR, or CNR.

Next, a dual energy image for an actual equivalent phantom formed of the first equivalent material and the second equivalent material is obtained with the actual radiographic imaging system (S550). For example, the dual energy image for the actual equivalent material phantom formed of P.P. and A.B.S. is obtained. The processor 110 receives the dual energy image obtained for the actual equivalent material phantom as described above.

The processor 110 converts the image intensity of the obtained dual energy image using the intensity change information for every material thickness of the corresponding energy of the intensity change table (S560). FIG. 7 illustrates an example of converting an image intensity for a dual energy image of an equivalent material phantom using intensity change information. Intensity change information for every material thickness corresponding to each of a low energy image and a high energy image of the dual energy image is searched from the intensity change table to convert the image intensity of the low energy image and the high energy image for every material thickness (that is, for every region of interest). The low energy image and the high energy image with the converted image intensity may be considered as a dual energy image for an ideal decomposition material phantom formed of the first material and the second material.

Next, the processor 110 obtains a material decomposition constant of a material decomposition algorithm based on the dual energy image with the converted image intensity and thicknesses (that is, a combination of a thickness of the material decomposition phantom) of the first material and the second material (S570). The material decomposition algorithm may be an equation representing a relationship between an image of a material to be decomposed and a dual energy image, as represented in the following Equation 1.

$$t_d = a_0 + a_1P_L + a_2P_H + a_3P_L^2 + a_4P_H^2 + a_5P_LP_H \qquad \text{[Equation 1]}$$

$$t_s = b_0 + b_1P_L + b_2P_H + b_3P_L^2 + b_4P_H^2 + b_5P_LP_H$$

Here, $t_d$ and $t_s$ indicate thicknesses of the first material and the second material to be decomposed, $P_L$ and $P_H$ are intensity values of the low energy image and the high energy image corresponding to $t_d$ and $t_s$, respectively, and $a_0$, $a_1$, $a_2$, $a_3$, $a_4$, $a_5$, $b_0$, $b_1$, $b_2$, $b_3$, $b_4$, and $b_5$ are material decomposition constants.

Here, the material decomposition constant may be obtained by various analysis methods, such as singular value decomposition (SVD), at least square method, or a machine learning technique including a neural network.

The material decomposition constant obtained according to the exemplary embodiment of the present disclosure may be obtained from a dual energy image of an ideal decomposition material phantom formed of the first material and the second material as a result of converting the image intensity of the dual energy image of the equivalent material phantom so that it may be an accurate material decomposition constant for decomposing the first material and the second material.

Next, a dual energy image of an object including the first material and the second material is obtained with the actual radiographic imaging system (S580). For example, the dual energy image of a portion including fat and muscle is obtained. The processor 110 receives the dual energy image of the object.

The processor 110 decomposes the first material and the second material from the dual energy image of the object using the material decomposition constant obtained in the step S570 (S590). By doing this, the accurate material decomposed image for each of the first material and the second material is obtained.

FIG. 8 illustrates a flowchart of a dual-energy technique based attenuation correction image obtaining method according to an exemplary embodiment of the present disclosure and FIG. 9 illustrates an example of an operation of a dual-energy technique based attenuation correction image obtaining method according to an exemplary embodiment of the present disclosure.

Referring to FIG. 8, the processor 110 of the attenuation correction image obtaining apparatus 100 obtains radiographic images of the first material and the second material from three-dimensional data (for example, CT or MRI data) of an object including the first material and the second material (S810). The radiographic images of the first material and the second material are obtained by generating three-dimensional data obtained by decomposing the first material and the second material from the three-dimensional data of the object and using a digitally reconstructed radiograph (DRR) technique.

The processor 110 obtains a material decomposed image of each of the first material and the second material from the dual energy image of the object (S820). At this time, the material decomposed image may be obtained by the material decomposing method of FIG. 5 described above.

Next, the processor 110 generates an attenuation difference image between the material decomposed image for each of the first material and the second material and the radiographic image for each of the first material and the second material (S830).

The steps S810 to S830 as described above are performed on a plurality of objects to generate learning data for training an attenuation difference prediction model to be described below.

When learning data is prepared, the processor 110 learns a weight of an attenuation difference prediction model which predicts an attenuation difference image between the material decomposed image and the radiographic image from the material decomposed image (S840). For example, the attenuation difference prediction model is trained with the material decomposed image for each of the first material and the second material as input data and the attenuation difference image of each of the first material and the second material as a correct answer label.

Next, the processor 110 receives material decomposed images of the first material and the second material from which a radiation attenuation image is to be obtained (S850). Here, the material decomposed image may be obtained by the material decomposing method of FIG. 5 as described above.

The processor 110 predicts the attenuation difference image from the material decomposed image for each of the first material and the second material using the trained attenuation difference prediction model (S860). That is, the material decomposed image is input to the trained attenuation difference prediction model to obtain an attenuation difference image predicted by the attenuation difference prediction model.

The processor 100 obtains a radiation attenuation image for each of the first material and the second material from the material decomposed image for each of the first material and the second material using the predicted attenuation difference image (S870). For example, the radiation attenuation image for each of the first material and the second material is obtained by adding the attenuation difference image to the material decomposed image for each of the first material and the second material.

Next, the processor 110 corrects image distortion of the radiation attenuation image for each of the first material and the second material (S880). The image distortion correction includes scatter correction and noise correction. The scatter correction may be performed using a scatter kernel based deconvolution technique or a prior-information technique. The noise correction may be performed using linear/non-linear filtering, domain transform based thresholding, or a prior-information technique.

Next, the processor 110 performs a quantitative material analysis using the radiation attenuation image for each of the first material and the second material (S890). For example, the processor 110 performs the correlation by extracting a feature of the image using the radiation attenuation image. The feature of the image is extracted using first/second order based probabilistic feature extraction or transform based feature extraction. In order to detect meaningful features among the extracted features, techniques such as manual removal methods, least absolute shrinkage and selection operator (LASSO), ridge, elastic net, and machine learning may be used as methods to reduce the dimension of the features. The processor 110 performs the classification based on the meaningful features using regression, a support vector machine (SVM), a decision tree, a random forest, and other machine learning.

According to the exemplary embodiment of the present disclosure, an accurate material decomposition constant is obtained by converting an image intensity to a phantom of a material to be decomposed from a dual energy image of the equivalent material phantom and a low density material may be accurately and effectively decomposed by utilizing the radiographic imaging system of the related art.

Further, a radiation attenuation image is obtained from the material decomposed image and the quantitative material analysis is performed based on the radiation attenuation image to obtain standardized high quality data for the low density material. As described above, the standardized high quality data enables establishment of precise and systematic inspection and management systems.

The exemplary embodiments of the present disclosure are applicable to various radiographic imaging systems (for example, panorama or CT) and may be applied to various fields, such as medicine, industry, or food. For example, the exemplary embodiments of the present disclosure may be applied to quantitative diagnostic testing devices for low-density materials such as fat and muscle mass along with existing bone density measurements, and can also be applied to various fields such as food testing such as marbling separation for determining the quality of meat and determining low-density narcotic materials.

The material decomposing apparatus and/or the attenuation correction image obtaining apparatus according to the exemplary embodiments of the present disclosure may be implemented in a logic circuit by hardware, firm ware, software, or a combination thereof or may be implemented using a general purpose or special purpose computer. The apparatus may be implemented using hardwired device, field programmable gate array (FPGA) or application specific integrated circuit (ASIC). Further, the material decomposing apparatus and/or the attenuation correction image obtaining apparatus may be implemented by a system on chip (SoC) including one or more processors and a controller.

The material decomposing apparatus and/or the attenuation correction image obtaining apparatus according to the exemplary embodiments of the present disclosure may be mounted in a computing device or a server provided with a hardware element as a software, a hardware, or a combination thereof. The computing device or server may refer to various devices including all or some of a communication device for communicating with various devices and wired/wireless communication networks such as a communication modem, a memory which stores data for executing programs, and a microprocessor which executes programs to perform operations and commands.

The operation according to the exemplary embodiments of the present disclosure may be implemented as a program command which may be executed by various computers to be recorded in a computer readable medium. The computer readable medium indicates an arbitrary medium which participates to provide a command to a processor for execution. The computer readable medium may include solely a program command, a data file, and a data structure or a combination thereof. For example, the computer readable medium may include a magnetic medium, an optical recording medium, and a memory. The computer program may be distributed on a networked computer system so that the computer readable code may be stored and executed in a distributed manner. Functional programs, codes, and code segments for implementing the present embodiment may be easily inferred by programmers in the art to which this embodiment belongs.

The above description illustrates a technical spirit of the present invention as an example and various changes, modifications, and substitutions become apparent to those skilled in the art within a scope of an essential characteristic of the present invention. Therefore, as is evident from the foregoing description, the exemplary embodiments and accompanying drawings disclosed in the present disclosure do not limit the technical spirit of the present disclosure and the scope of the technical spirit is not limited by the exemplary embodiments and accompanying drawings. The protective scope of the present disclosure should be construed based on the following claims, and all the technical concepts in the equivalent scope thereof should be construed as falling within the scope of the present disclosure.

What is claimed is:

1. A dual energy technique based material decomposing method, comprising:

a step of obtaining intensity change information between a radiographic image of a decomposition material phantom formed of a first material and a second material to be decomposed and a radiographic image of an equivalent material phantom formed of a first equivalent material and a second equivalent material corresponding to the first material and the second material, respectively, using a simulated radiographic imaging system;

a step of converting an image intensity of the equivalent material phantom using the intensity change information from a dual energy image;

a step of obtaining a material decomposition constant based on the dual energy image with a converted image intensity; and a step of decomposing the first material and the second material from a dual energy image of an object including the first material and the second material using the material decomposition constant.

2. The dual energy technique based material decomposing method according to claim 1, wherein the step of obtaining intensity change information includes:

a step of modeling the decomposition material phantom and the equivalent material phantom;

a step of obtaining a radiographic image for the modeled decomposition material phantom and equivalent material phantom, with the simulated radiographic imaging system; and a step of obtaining intensity change information between the radiographic image of the modeled decomposition material phantom and the radiographic image of the modeled equivalent material phantom.

3. The dual energy technique based material decomposing method according to claim 2, wherein in the step of obtaining a radiographic image, an image for every radiation energy is obtained for each of the modeled decomposition material phantom and equivalent material phantom and in the step of obtaining intensity change information, the intensity change information for every radiation energy is obtained.

4. The dual energy technique based material decomposing method according to claim 3, wherein in the step of obtaining intensity change information, for every radiation energy, an image intensity mean value or change information of a representative value between a region of interest corresponding to a thickness of a material to be decomposed in a radiographic image of the decomposition material phantom and an area matching the region of interest of the radiographic image of the decomposition material phantom in the radiographic image of the equivalent material phantom is obtained to be stored in an intensity change table.

5. The dual energy technique based material decomposing method according to claim 4, wherein the step of converting an image intensity includes:

a step of obtaining a dual energy image for the actual equivalent material phantom with the actual radiographic imaging system; and a step of converting the image intensity of the obtained dual energy image using intensity change information for every material thickness of the energy of the intensity change table.

6. A computer program which is stored in a computer readable storage medium to allow a computer to execute the dual energy technique based material decomposing method according to claim 1.

7. A dual energy technique based material decomposing apparatus, comprising:

a memory which stores one or more programs to decompose a material based on a dual energy technique; and one or more processors which perform an operation of decomposing a material based on a dual energy technique by one or more programs stored in the memory, wherein the processor is configured to obtain intensity change information between a radiographic image of a decomposition material phantom formed of a first material and a second material to be decomposed and a radiographic image of an equivalent material phantom formed of a first equivalent material and a second equivalent material corresponding to the first material and the second material, respectively, using a simulated radiographic imaging system, convert an image intensity of the equivalent material phantom using the intensity change information from a dual energy image, obtain a material decomposition constant based on the dual energy image with a converted image intensity, and decompose the first material and the second material from a dual energy image of an object including the first material and the second material using the material decomposition constant.

8. The dual energy technique based material decomposing apparatus according to claim 7, wherein when the intensity change information is obtained, the processor is configured to model the decomposition material phantom and the equivalent material phantom, obtain a radiographic image for the modeled decomposition material phantom and equivalent material phantom, with the simulated radiographic imaging system, and obtain intensity change information between the radiographic image of the modeled decomposition material phantom and the radiographic image of the modeled equivalent material phantom.

9. The dual energy technique based material decomposing apparatus according to claim 8, wherein the processor is configured to obtain an image for every radiation energy for each of the modeled decomposition material phantom and equivalent material phantom when the radiographic image is obtained and obtain the intensity change information for every radiation energy when intensity change information is obtained.

10. The dual energy technique based material decomposing apparatus according to claim 9, wherein the processor is configured to obtain, for every radiation energy, an image intensity mean value or change information of a representative value between a region of interest corresponding to a thickness of a material to be decomposed in a radiographic image of the decomposition material phantom and an area matching the region of interest of the radiographic image of the decomposition material phantom in the radiographic image of the equivalent material phantom to be stored in an intensity change table when intensity change information is obtained.

11. The dual energy technique based material decomposing apparatus according to claim 10, wherein when the image intensity is converted, the processor receives a dual energy image obtained for an actual equivalent material phantom with an actual radiographic imaging system and converts the image intensity of the obtained dual energy image using intensity change information for every material thickness of the energy of the intensity change table.

* * * * *